United States Patent [19]

Lacroix

[11] Patent Number: 5,184,250
[45] Date of Patent: Feb. 2, 1993

[54] DEVICE FOR THE DISPLAY OF SIMULATED IMAGES FOR HELMETS

[75] Inventor: Michel Lacroix, Bois d'Arcy, France

[73] Assignee: Thomson-CSF, Puteaux, France

[21] Appl. No.: 708,282

[22] Filed: May 31, 1991

[30] Foreign Application Priority Data

Jun. 1, 1990 [FR] France ............... 90 06873

[51] Int. Cl.⁵ .............. G02B 27/10; G02B 17/00; G02B 23/04; G02B 23/06; G09B 9/08
[52] U.S. Cl. .................. 359/631; 359/633; 359/482; 434/43; 434/44
[58] Field of Search .............. 359/630, 618, 631, 632, 359/633, 462, 471, 482; 340/705; 434/40, 43, 44; 358/87, 88, 103, 104

[56] References Cited

U.S. PATENT DOCUMENTS

| 3,923,370 | 12/1975 | Mostrom . | |
| 4,340,878 | 7/1982 | Spooner et al. . | |
| 4,347,508 | 8/1982 | Spooner | 434/44 |
| 4,348,185 | 9/1982 | Breglia et al. | 434/44 |
| 4,348,187 | 9/1982 | Dotsko | 434/44 |
| 4,439,157 | 3/1984 | Breglia et al. | 359/618 |
| 4,465,347 | 8/1984 | Task et al. . | |
| 4,588,382 | 5/1986 | Peters . | |
| 4,755,868 | 7/1988 | Hodges . | |
| 4,902,116 | 2/1990 | Ellis | 359/630 |
| 5,035,474 | 7/1991 | Moss et al. | 359/630 |

FOREIGN PATENT DOCUMENTS 2517916 6/1983 France .................. 358/88

OTHER PUBLICATIONS

N.T.I.S. Tech Notes, Nov. 1986, p. 1160, Springfield, Va., US; "Fiber optic helmet mounted display".

Primary Examiner—Jon W. Henry
Attorney, Agent, or Firm—Oblon, Spivak, McClelland, Maier & Neustadt

[57] ABSTRACT

The disclosed display device for simulators has an off-axis collimated display system: a spherical screen and a spherical mirror that are fixed to a helmet worn by the user. This device gives a wide horizontal field and a relatively low attenuation of the external view.

15 Claims, 2 Drawing Sheets

DEVICE FOR THE DISPLAY OF SIMULATED IMAGES FOR HELMETS

BACKGROUND OF THE INVENTION

The present invention relates to a device for the display of simulated images for helmets.

The systems generally used to restore images in a simulator, such as an aircraft simulator, are systems such as CRT-based collimation systems or off-axis collimated display systems with a spherical screen and mirror, where this mirror may be a sphere with a large diameter (several meters). Systems such as this work accurately but have a bulk and weight that are often very great, and may require a complicated infrastructure.

Besides, there are known display devices using optic systems with lenses and mirror, fixed to a helmet worn by the user. These devices are generally compact and light, but their visual field is limited, and their light output is low.

An object of the present invention is a device for the display of simulated images for helmets that is light and compact, and makes it possible to restore images with the widest possible field and the highest possible light output.

SUMMARY OF THE INVENTION

The display device according to the invention has at least one device for collimation at infinity with a spherical mirror and screen fixedly joined to a helmet worn by the user, associated with a remote projector connected, firstly, by optic fiber to an optic relay device fixed to the helmet and, secondly, to an image generator, the image generator being connected to a device for sensing the position of the head of the helmet wearer.

BRIEF DESCRIPTION OF THE DRAWINGS

The present invention shall be understood more clearly from the following detailed description of an embodiment, taken as a non-restrictive example and illustrated by the appended drawings, wherein.

DETAILED DESCRIPTION OF THE INVENTION

Figure 1:
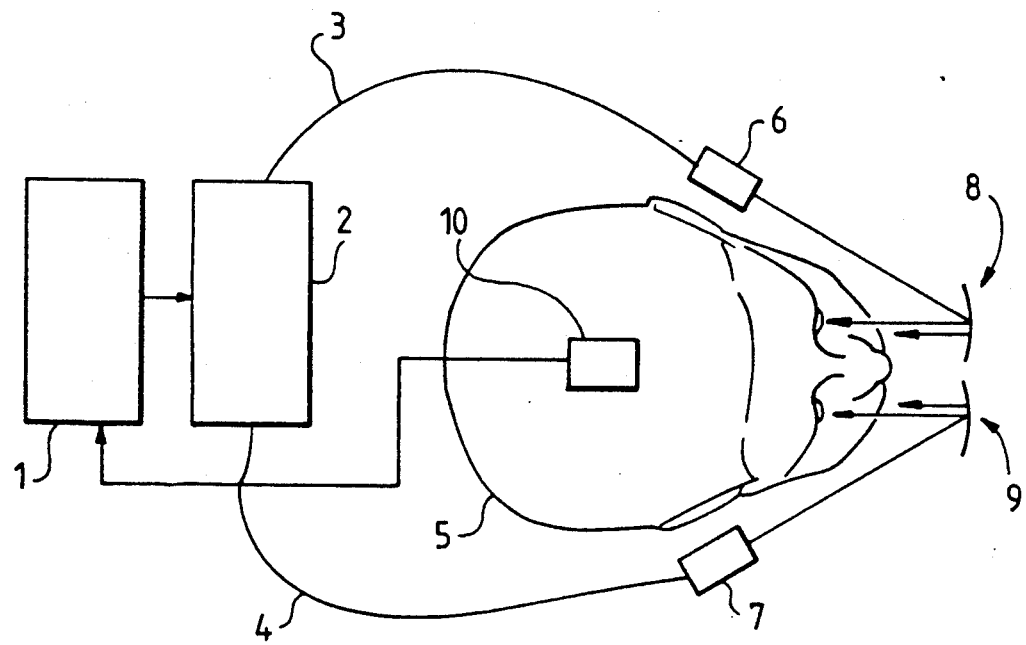
FIG. 1 is a schematic view of a device according to the invention.

The display device shown in FIG. 1 essentially has an image generator 1, a projector 2, an optic fiber 3, 4 to carry images relating to each eye of the user 5, an optic relay device 6, 7 fixed to the end of each optic fiber and a corresponding optic image-formation optic device 8, 9 described in greater detail here below with reference to FIGS. 2 and 3.

The elements 1 and 2 may be distant from the user, with the optic fibers having the necessary length. The elements 6 to 9 are fixed suitably to a helmet (not shown) worn by the user 5. Furthermore, a device 10, namely a position sensor of a user's head, of a type known per se, is fixed to this helmet. This device 10 is connected to the image generator 1 to control therein, in a manner known per se, the movements of a "window" corresponding to the zone of interest that has to be seen by the user.

Figure 2:
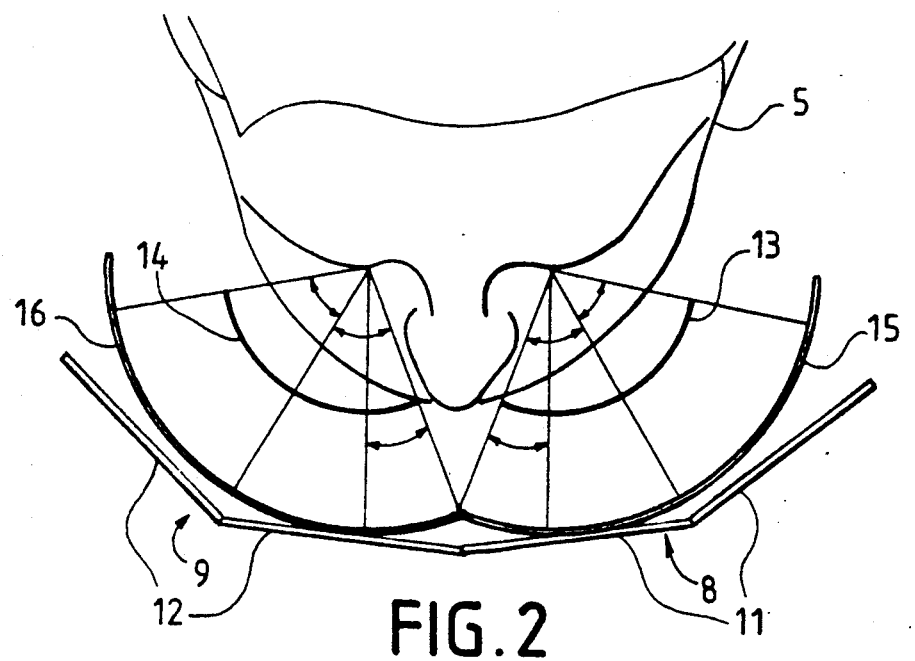
FIG. 2 is a top view of the optic part, fixedly joined to the helmet, of the device of FIG. 1.
Figure 3:
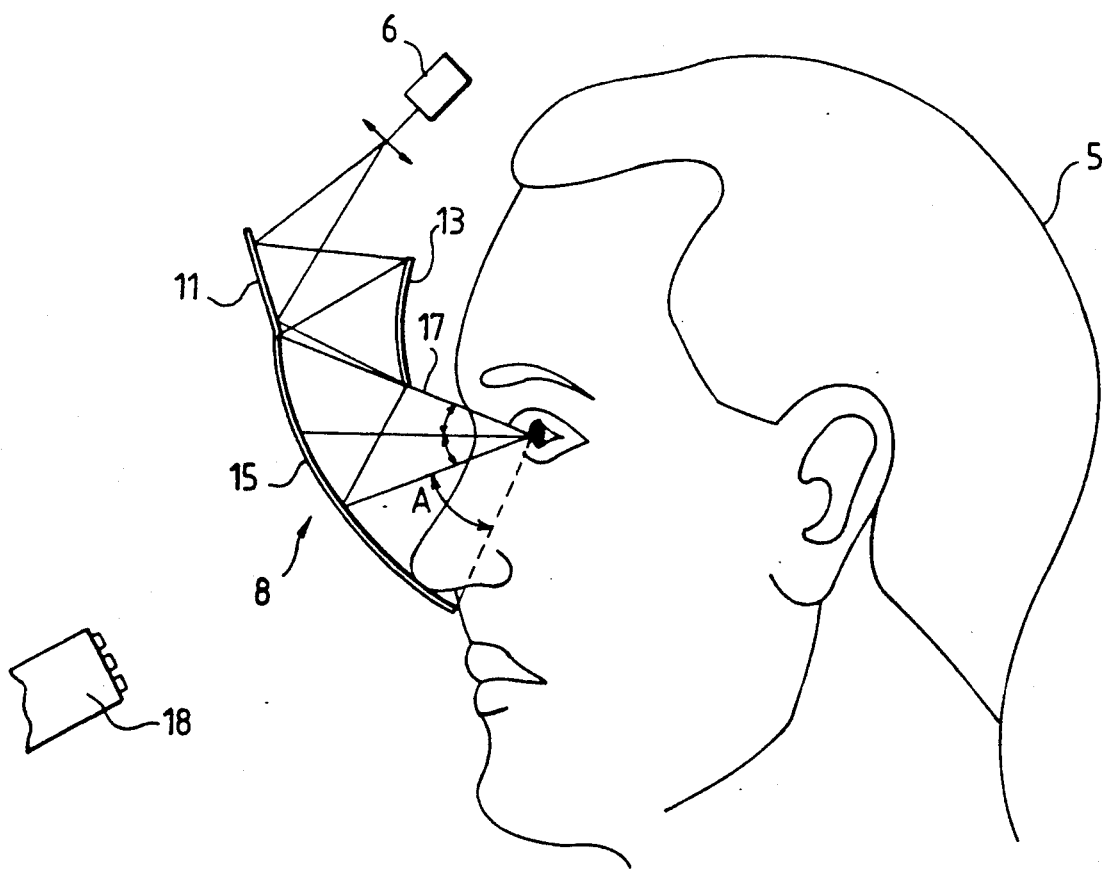
FIG. 3 is a side view of the optic part of FIG. 2.

FIGS. 2 and 3 show detailed views of the optic devices 8 and 9. These devices 8 and 9 are identical. Each of them has two adjacent image formation channels to increase the horizontal field of the images, but it is clear that if it were not necessary to obtain a very large horizontal field, a single channel would be enough for each of the devices 8 and 9. In the present example, each channel has a horizontal field of about 50°.

The devices 8 and 9 each have: a plane mirror (11, 12 respectively), a spherical screen (13, 14 respectively) and a spherical mirror that is at least partly semi-reflective (15, 16 respectively). The concave faces of the screens and of the spherical mirrors are pointed towards the user. The plane mirrors and the screens are located above the horizontal plane passing through the centers of the observer's eyes, while the semi-transparent spherical mirrors 15, 16 are substantially at the level of the user's eyes. These mirrors 15, 16 are fixed at a few centimeters from the user's eyes. When the user looks straight ahead, his instantaneous, vertical visual field, which is about 40°, covers the upper part of the mirrors 15, 16, the lower part of these mirrors corresponding to a vertical field of about 40° (angle A in FIG. 3) which the user may cover by lowering his eyes. The screens 13, 14 are positioned in relation to the mirrors 15, 16 so that, when the user looks straight ahead, the upper boundary 17 of this vertical field is practically tangential to the lower edges of these screens and to the upper edges of the mirrors 15, 16 (see FIG. 3). The devices 6, 7 are devices, of a type known per se, with lenses enabling the projection, on the mirrors 11, 12, of the images conveyed by the fibers 3, 4. When, as shown in the drawings, the devices 8 and 9 are two-channel devices, the fibers 3 and 4 are doubled, as are the devices 6 and 7 and the mirrors 11, 12. The images formed by the devices 6, 7 on the mirrors 11, 12 are sent on by these mirrors 11, 12 to the screens 13, 14. Thus, in looking at the mirrors 15, 16, the user 5 may see the images formed on the screens 13, 14.

Naturally, the image generator and the projectors are made so as to provide for the perfect superimposition of the images seen by the right eye and the left eye in the zone where the visual fields of these two eyes overlap. The mirrors 15 and 16 are semi-reflective to enable the user to see the instruments of the instrument panel 18 through them.

The device 10, in sensing the motions of the user's head, sends information to the image generator 1. This information can be used, in a manner known per se, to control the relative movements of the "zone of interest" seen by the user in correspondence with the movements of his head.

Figure 4:
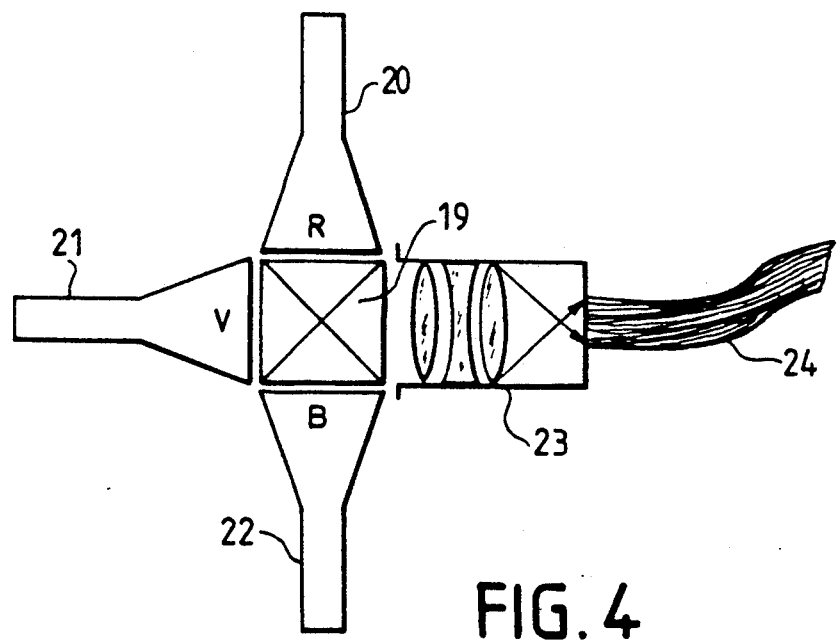
FIG. 4 is a schematic view of an embodiment of a projector that can be used in the device of FIG. 1.

FIG. 4 shows a dichroic mixer that can be used with high-brilliance tubes. This mixer has a dichroic prism 19. To three facets of this prism, there are attached high-brilliance cathode-ray tubes, 20 to 22, red, green and blue respectively. An optic device 23, for coupling with an optic fiber 24, is attached to a fourth facet of the prism 19. This mixer device is used for each of the display channels relating to each eye of the observer.

One embodiment of the invention uses a "light valve" projector or liquid crystal projector of a type that is well known per se.

If the projector used is of the type with high-brilliance tubes, the geometric distortions of the projectors and of the entire optic part of the simulator according to the invention are corrected in the projectors. It is relatively easy to make all the necessary corrections therein, especially to obtain the perfect superimposition of the images in the overlapping zone (extending, horizontally, over about 30° to 40°) of the visual fields relating to the right eye and to the left eye.

If the projector used is of the light valve or liquid crystal type, the geometric distortions are corrected in the image generator for it is not possible, at present, to make corrections in the projectors.

The device of the invention can thus be used to obtain a wide visual field: with two channels for each eye, we arrive at a monocular field of about 100° in the horizontal direction and 40° in the vertical direction, the total field being about 160° in the horizontal direction and 40° in the vertical direction (with an overlapping of 40° at the center). The semi-reflective spherical mirror is the device that least attenuates the external images (such as those of the instrument panel 18).

One of the advantages of an embodiment of the invention lies in the use of projectors with high-brilliance tubes that enable the geometric distortions to be corrected in the projectors: this frees the image generator from this task which is costly in terms of computing time. The use of projectors with high-brilliance tubes is possible because of their high light output.

What is claimed is:

1. A device for the display of simulated images for helmets, comprising at least one device for collimation at infinity with a spherical mirror and a spherical screen fixedly joined to a helmet worn by the user, associated with a remote projector connected, firstly, by an optic fiber to an optic relay device fixed to the helmet and, secondly, to an image generator, the image generator being connected to a device for sensing the position of the head of the helmet wearer.

2. A device according to claim 1, including two display channels for the eyes of the user.

3. A device according to claim 1, wherein the spherical minor is at least partly semi-reflective.

4. A device according to claim 1, wherein the projection comprises a light valve.

5. A device according to claim 1, wherein the projection comprises a liquid crystal.

6. A device according to claim 1, wherein the projection comprises high-brilliance cathode-ray tubes.

7. A device according to claim 1, wherein the correction of the geometric distortions is done in the image generator.

8. A device according to claim 1, wherein the correction of the geometric distortions is done in the projector.

9. A device for a helmet for the display of simulated images, comprising:
   an image generator for generating a simulated image;
   a projector connected to said image generator for receiving the simulated image and for projecting the simulated image;
   an optic fiber connected to said projector for transmitting said simulated image;
   an optic relay device connected to the helmet for receiving the simulated image from the topic fiber;
   at lest one optic image-formation device connected to said optic relay device for collimation at infinity of said simulated image, each optic image-formation device comprising a spherical mirror and a spherical screen joined to the helmet; and
   sensing means for sensing the position of the helmet, said sensing means being connected to said image generator.

10. The device according to claim 9, wherein the spherical mirror is at least partly semi-reflective.

11. The device according to claim 9, wherein the projector comprises a light valve.

12. The device according to claim 9, wherein the projector comprises a liquid crystal.

13. The device according to claim 9, wherein the projector comprises at least one high-brilliance cathode ray tube.

14. The device according to claim 9, wherein the image generator corrects geometric distortions.

15. The device according to claim 9, wherein the projector corrects geometric distortions.

* * * * *